US012084887B2

(12) United States Patent
Tartal et al.

(10) Patent No.: US 12,084,887 B2
(45) Date of Patent: Sep. 10, 2024

(54) WEATHER-RESISTANT LOCK

(71) Applicant: United States Postal Service, Washington, DC (US)

(72) Inventors: William Albert Tartal, Baltimore, MD (US); Donald Eugene Irwin, Fredericksburg, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/366,557

(22) Filed: Aug. 7, 2023

(65) Prior Publication Data

US 2023/0407672 A1 Dec. 21, 2023

Related U.S. Application Data

(63) Continuation of application No. 16/822,631, filed on Mar. 18, 2020, now Pat. No. 11,761,233.

(Continued)

(51) Int. Cl.
*E05B 17/00* (2006.01)
*A47G 29/12* (2006.01)

(Continued)

(52) U.S. Cl.
CPC ...... *E05B 17/0062* (2013.01); *A47G 29/1201* (2013.01); *A47G 29/1207* (2013.01);

(Continued)

(58) Field of Classification Search
CPC .... E05B 17/00; E05B 17/0062; E05B 17/142; E05B 17/2003; E05B 17/2084;

(Continued)

(56) References Cited

U.S. PATENT DOCUMENTS 721,802 A 3/1903 Horne
1,906,701 A 5/1933 Maxwell et al.

(Continued)

FOREIGN PATENT DOCUMENTS

CH 616 199 A5 3/1980
CN 103774922 B 4/2017

(Continued)

OTHER PUBLICATIONS

International Search Report and Written Opinion dated Aug. 2, 2018 in International Application No. PCT/US2018/022828.

(Continued)

*Primary Examiner* — Suzanne L Barrett
(74) *Attorney, Agent, or Firm* — Knobbe, Martens, Olson & Bear LLP

(57) ABSTRACT

A lock can include attack-resistant and/or weather-resistant features. Attack-resistant features can include a sacrificial link between a locking mechanism and an external keyway covering an exterior face of the locking mechanism. The sacrificial link can break during a torque attack on the lock such that the full force of the torque attack is not applied to the locking mechanism. Weather-resistant features can include drain openings in one or more housing components external to the locking mechanism to facilitate drainage of liquid matter from the lock before the liquid matter reaches the locking mechanism.

16 Claims, 8 Drawing Sheets

Related U.S. Application Data

(60) Provisional application No. 62/821,123, filed on Mar. 20, 2019.

(51) Int. Cl.
*E05B 9/04* (2006.01)
*E05B 15/16* (2006.01)
*E05B 17/14* (2006.01)
*E05B 17/20* (2006.01)
*E05B 65/52* (2006.01)

(52) U.S. Cl.
CPC ............ *E05B 9/04* (2013.01); *E05B 15/1635* (2013.01); *E05B 17/142* (2013.01); *E05B 17/2003* (2013.01); *E05B 17/2084* (2013.01); *E05B 65/52* (2013.01); *E05Y 2900/602* (2013.01)

(58) Field of Classification Search
CPC ........ E05B 65/52; E05B 15/1635; E05B 9/04; E05Y 2900/602; A47G 29/1201; A47G 29/1207; Y10T 70/8622; Y10T 70/8568; Y10T 70/8649
USPC ............................................................ 70/101
See application file for complete search history.

(56) References Cited

U.S. PATENT DOCUMENTS 2,562,038 A 7/1951 Jacobi
2,690,070 A 9/1954 Spain
2,803,959 A 8/1957 Schlage
2,977,786 A 4/1961 Marron et al.
3,077,101 A 2/1963 Jacobi
3,122,013 A 2/1964 Jacobi
3,263,463 A 8/1966 Duval et al.
3,503,233 A 3/1970 Russell et al.
3,702,553 A 11/1972 Nolin
3,705,508 A 12/1972 Fritsch et al.
3,714,804 A 2/1973 French
3,815,390 A 6/1974 Stoia
4,006,616 A 2/1977 Rubner et al.
4,074,547 A 2/1978 Seidewand
4,074,548 A 2/1978 Milton
4,083,212 A 4/1978 Proefrock
4,123,926 A 11/1978 Elder
4,145,978 A 3/1979 Johnson et al.
4,254,648 A 3/1981 Dietrich
4,300,374 A 11/1981 Mullich et al.
4,338,806 A 7/1982 Cox
4,349,722 A 9/1982 Kurth et al.
4,424,693 A 1/1984 Best et al.
4,559,795 A 12/1985 Zagoroff
4,593,546 A 6/1986 Allen
4,633,690 A 1/1987 Foshee
4,638,651 A 1/1987 Surko, Jr.
4,669,282 A 6/1987 Hoyt et al.
4,679,418 A 7/1987 Allen
4,688,405 A 8/1987 Epstein
4,703,638 A 11/1987 Bergstrom
4,741,188 A 5/1988 Smith
4,750,342 A 6/1988 Nakai
5,209,087 A 5/1993 Cox
5,475,998 A 12/1995 Raskevicius
5,548,981 A 8/1996 Kirk
5,832,753 A 11/1998 Nielsen
6,474,122 B2 11/2002 Davis
7,003,994 B2 2/2006 Ruan
7,357,010 B1 4/2008 Huang et al.
7,392,677 B1 7/2008 Fan
7,426,842 B2 9/2008 Hsieh
7,836,735 B2 11/2010 Liu
8,327,675 B2 12/2012 Baumann
8,336,349 B2 12/2012 Thimmappa et al.
8,539,803 B2 9/2013 Widén
8,720,241 B1 5/2014 Widén
8,943,864 B2 2/2015 Rasmussen et al.
9,273,487 B2 3/2016 Irwin et al.
11,391,060 B2 * 7/2022 McLeod ............... E05B 17/142
11,761,233 B2 * 9/2023 Tartal .................. E05B 17/0062 70/101
2002/0026817 A1 3/2002 Greer
2002/0104344 A1 8/2002 Nieves
2004/0007032 A1 1/2004 Davis
2005/0097933 A1 5/2005 Ruan
2008/0196460 A1 8/2008 Houlihan et al.
2008/0276666 A1 11/2008 Irwin et al.
2010/0326150 A1 12/2010 Chung
2011/0259065 A1 10/2011 Rao et al.
2016/0281390 A1 9/2016 Chow
2017/0226773 A1 * 8/2017 McLeod ................. E05C 3/042

FOREIGN PATENT DOCUMENTS

DE 19533528 A1 3/1997
EP 0316583 B1 2/1993
EP 0933495 A1 8/1999
EP 1106753 A1 6/2001
EP 3216949 A1 9/2017
RU 36694 U1 3/2004
WO WO 2013/093188 A1 6/2013
WO WO 2014/149057 A1 9/2014

OTHER PUBLICATIONS

International Preliminary Report on Patentability dated Sep. 17, 2019 in International Application No. PCT/US2018/022828.
International Preliminary Report on Patentability dated Sep. 30, 2021 in International Application No. PCT/US2020/023392 filed Mar. 18, 2020.
International Search Report and Written Opinion dated Aug. 7, 2020 in International Application No. PCT/US2020/023392 filed Mar. 18, 2020.

* cited by examiner

WEATHER-RESISTANT LOCK

CROSS-REFERENCE TO RELATED APPLICATIONS

This application is a continuation of U.S. application Ser. No. 16/822,631, filed Mar. 18, 2020, entitled ATTACK-RESISTANT AND WEATHER-RESISTANT LOCK, which claims the benefit of priority to U.S. Provisional Application No. 62/821,123, filed Mar. 20, 2019, entitled ATTACK-RESISTANT AND WEATHER-RESISTANT LOCK, both of which are hereby incorporated by reference in their entirety.

FIELD

This disclosure relates to locks with enhanced resistance to torque attacks and weather.

DESCRIPTION OF THE RELATED TECHNOLOGY

Doors, item receptacles, mailboxes, and various other enclosures have long been secured with locks. Due to the potential for valuable items to be present within lock-secured locations, locks are frequently the target of attacks such as picking, snapping, or the like. Pin tumbler locks are often susceptible to torque attacks in which a forceful rotational motion is applied at the keyway to dislodge the lock plug or cylinder, allowing the lock to be removed. Pin tumbler locks may also be susceptible to weather conditions such as rain, freezing rain, sleet, slush, ice storms, wintry mix, or the like, as liquid precipitation may enter the lock cylinder and/or plug and subsequently freeze within the lock, thereby preventing its intended operation.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a securable receptacle is described. The securable receptacle comprises a wall at least partially surrounding an inner volume of the receptacle, a hinged door coupled to the receptacle, and a lock coupled to and extending through the wall or the hinged door. The lock comprises a locking mechanism at least partially disposed within the inner volume of the receptacle, the locking mechanism configured to be actuated by a key; an external keyway disposed external to the inner volume and aligned with a keyway of the locking mechanism; and a sacrificial link at least partially coupling the external keyway to the locking mechanism, the sacrificial link configured to fail when a threshold torque is applied at the external keyway.

In some embodiments, the threshold torque is smaller than a torque required to break or dislodge the locking mechanism. In some embodiments, the sacrificial link comprises a plastic coupling rotationally fixing the external keyway to the locking mechanism. In some embodiments, the securable receptacle further comprises a drain in fluid communication with the external keyway, the drain configured to accommodate gravity-assisted drainage of fluid from the external keyway. In some embodiments, the securable receptacle further comprises an external housing at least partially surrounding the external keyway and the sacrificial link. In some embodiments, the locking mechanism remains operable and accessible via the external keyway when the sacrificial link has failed. In some embodiments, the locking mechanism comprises a pin tumbler lock. In some embodiments, the securable receptacle is a cluster mailbox.

In another embodiment, an attack-resistant lock is described. The attack-resistant lock comprises a housing comprising an internal section and an external section; a locking mechanism disposed at least partially within the internal section of the housing, the locking mechanism comprising a keyway configured to receive a key blade for actuating the locking mechanism; and an external keyway structure disposed within the external section of the housing. The external keyway structure comprises a scalp covering an externally facing side of the locking mechanism; an opening sized and shaped to receive the key blade, the opening aligned with the keyway such that a key blade can be inserted into the keyway through the opening; and a sacrificial fixing structure configured to prevent rotation of the external keyway relative to the locking mechanism. The sacrificial fixing structure is further configured to separate from the external keyway structure when a threshold torque is applied at the opening, and wherein the threshold torque is insufficient to dislodge the locking mechanism from the housing.

In some embodiments, the sacrificial fixing structure comprises one or more tabs integrally formed with at least a portion of the external keyway structure, the one or more tabs disposed within tab openings of the locking mechanism configured to retain the one or more tabs such that the tabs break away from the external keyway structure when the threshold torque is applied at the opening. In some embodiments, the one or more tabs and the portion of the external keyway structure comprise plastic, and wherein the locking mechanism comprises a metal. In some embodiments, separation of the sacrificial structure from the external keyway structure allows the external keyway structure to be rotatable relative to the locking mechanism while being retained within the housing. In some embodiments, the attack-resistant lock remains functional after separation of the sacrificial structure. In some embodiments, the attack-resistant lock further comprises a drain. In some embodiments, the drain comprises a first drain opening extending through a bottom portion of the housing and a second drain opening extending through a bottom portion of the external keyway structure, the first drain opening and the second drain opening substantially aligned to accommodate drainage of liquid matter from the external keyway structure and the housing. In some embodiments, the housing comprises an outer scalp coupled to the external section of the housing, and wherein the outer scalp retains the external keyway structure within the housing. In some embodiments, the housing prevents external access to the keyway other than through the external keyway structure.

In another embodiment, a weather-resistant lock is described. The weather-resistant lock comprises a locking mechanism comprising a keyway configured to receive a key blade for actuating the locking mechanism, and a housing at least partially surrounding the locking mechanism. The housing comprises an internal section retaining the locking mechanism and configured to be disposed in an interior volume of a receptacle when the weather-resistant lock is in an installed configuration, and an external section configured to be disposed outside the interior volume, the external section comprising a drain opening. In the installed configuration, the drain opening is disposed at a lower height relative to the locking mechanism to facilitate drainage of liquid matter from the housing.

In some embodiments, the weather-resistant lock further comprises an external keyway structure retained within the external section of the housing, the external keyway structure comprising an external keyway drain opening aligned with the drain opening of the external section to facilitate drainage of liquid matter from the external keyway structure. In some embodiments, the weather-resistant lock further comprises a keyway flap pivotable between an open position and a closed position blocking ingress of foreign matter into the keyway, wherein the keyway flap is biased in the closed position.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1A:
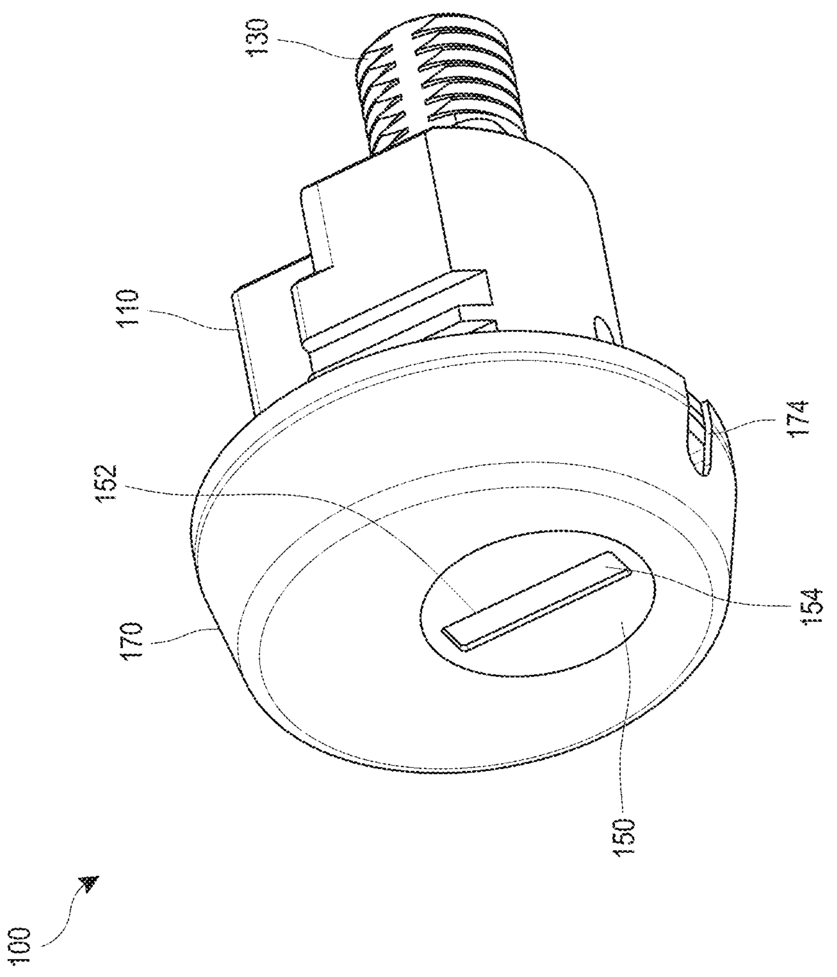
FIG. 1A is a perspective view of an example embodiment of a lock with attack-resistant and weather resistant features.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

The present disclosure provides locking systems and devices that provide enhanced resistance to tampering and/or weather. Some of the locks described herein include one or more anti-tampering features to prevent or mitigate damage to the locks in the event of torque attacks. In some embodiments, an attack-resistant lock includes a cylinder lock coupled to one or more external components by one or more sacrificial links such that a torque attack results in breakage of the sacrificial links but does not damage or dislodge the lock plug or cylinder. Some embodiments of the present disclosure incorporate weather-resistant features, such as one or more drain holes within external components of a lock that facilitate drainage of liquids and prevent liquids from entering internal components of the lock.

As used herein, the term "receptacle" may include any enclosed or partially enclosed space. Non-limiting examples of receptacles may include mailboxes, lockers such as parcel lockers, letter or package drop boxes, collection boxes, postal relay boxes, safe deposit boxes, or any other lockable volume. In some examples, a receptacle may be a cluster mailbox having a plurality of individually lockable receptacles accessible through a plurality of individual doors on a first side (e.g., a front side) for access by recipients, and through one or more universal doors on the first side or a second side (e.g., a rear side) for access by a mail carrier, property manager, or other authorized user.

Figure 1B:
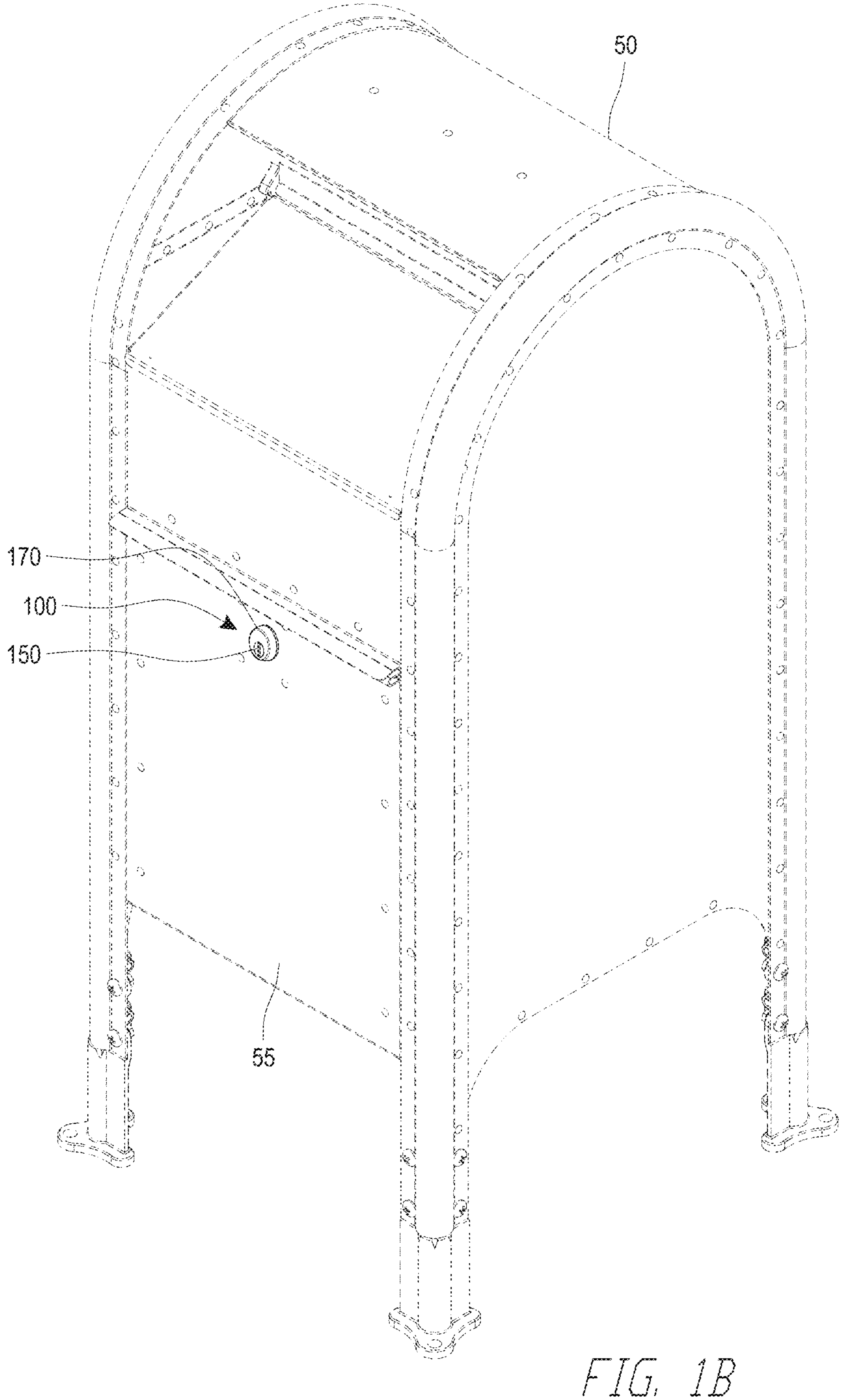
FIG. 1B is a perspective view of the lock of FIG. 1A as installed on a receptacle door.
Figure 1C:
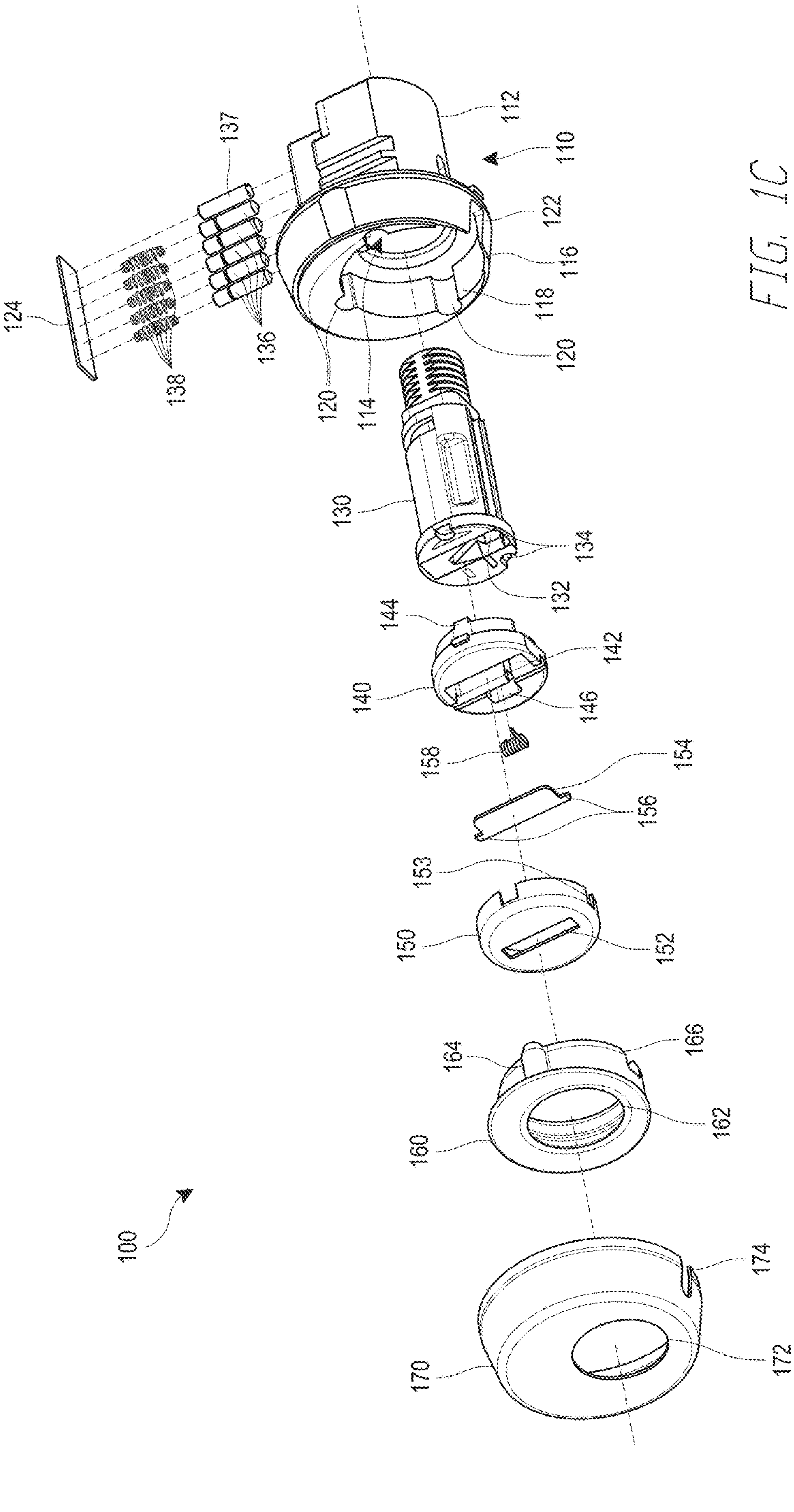
FIG. 1C is an exploded perspective view of the lock of FIGS. 1A and 1B illustrating the components thereof.

FIG. 1A is a bottom right front perspective view of a lock 100 incorporating attack-resistant and weather-resistant features. FIG. 1B is a perspective view depicting the lock 100 installed on a door 55 of a receptacle 50. FIG. 1C is an exploded view of the lock 100 illustrating internal and external components thereof. Any of the various components of the lock 100 may comprise one or more suitable materials such as metals (e.g., aluminum, steel, copper, or the like), plastics or other polymeric materials (e.g., rigid plastics, etc.), or other suitably rigid materials. In some embodiments, components of the lock 100 that will be exposed to the exterior when installed may be formed from metals such as aluminum or steel for enhanced durability and/or resistance to forces applied thereto.

The lock 100 includes a cylinder 110 having an internal section 112 and an external section 116, and a plug 130 at least partially disposed within an internal volume 114 of the internal section 112 of the cylinder 110. A well 118 in the external section 116 of the cylinder 110 contains an intermediate faceplate 140, a plug scalp 150, and a cylinder seal 160. A cylinder scalp 170 is secured about the external section 116 of the cylinder 110 to form an external housing of outward-facing components of the lock 100.

The plug 130 may be any suitable type of locking mechanism configured to be opened by a key. For example, the plug 130 may comprise a pin tumbler lock or other tumbler lock. In the case of a pin tumbler lock, a plurality of tumblers 136 and corresponding springs 138 are retained within the cylinder 110 by a tumbler retainer 124. In some embodiments, a retaining pin 137 is included to retain the plug 130 within the cylinder 110 prior to installation (e.g., during shipping, delivery, handling, etc.). A keyway 132 is sized and shaped to accommodate the blade of a corresponding key to actuate the plug 130 to lock or unlock the lock 100.

The intermediate faceplate 140 includes an inner keyway opening 142 oriented to align with the keyway 132 of the plug 130. Similarly, the plug scalp 150 includes an outer keyway opening 152 oriented to align with the keyway 132 of the plug 130. In some embodiments, the inner keyway opening 142 and the outer keyway opening 152 can be sized larger than the cross-sectional profile of the corresponding key in order to allow the key to access the keyway 132 of the plug 130 through the inner keyway opening 142 and the outer keyway opening 152. The inner keyway opening 142 and the outer keyway opening 152 form an external keyway opening through which a key or other object must pass to reach the keyway 132. Components such as the intermediate faceplate 140, the plug scalp 150, and/or any other components disposed along a key entry path external to the plug 130 (e.g., any components contained within the well 118 of the external section 116 of the cylinder 110) are collectively referred to herein as an external keyway or as external keyway components.

The intermediate faceplate 140 includes tabs 144 sized and shaped to fit within tab openings 134 at the periphery of the plug 130. When disposed within the tab openings 134, the tabs 144 prevent rotation of the intermediate faceplate 140 to retain the intermediate faceplate 140 in a desired orientation such that the inner keyway opening 140 and the outer keyway opening 152 remain aligned with the keyway 132 of the plug 130. As will be described in greater detail with reference to FIGS. 3A-3D, the tabs 144 may also serve as a sacrificial link during torque attacks by breaking away from the intermediate faceplate 140 when a relatively large torque is applied at the inner keyway opening 142. Accordingly, the intermediate faceplate 140 and the tabs 144 may be integrally formed from a plastic having a suitable strength such that the tabs 144 can break away from the intermediate faceplate 140 under a torque small enough to be exerted by a human using a tool such as a screwdriver.

A keyway flap 154 may be disposed between the inner keyway opening 142 and the outer keyway opening 152. The keyway flap 154 may advantageously act as a shutter or barrier to keep unwanted matter out of the keyway 132. For example, the keyway flap 154 may prevent the ingress of dust, dirt, water, snow, or other materials that may clog the keyway 132. In the example embodiment of FIGS. 1A-1C, the keyway flap 154 is sized and shaped to fit within the inner keyway opening 142 of the intermediate faceplate 140. The keyway flap 154 is biased in a closed position by a biasing member 158 such as a spring housed within a spring housing 146 of the intermediate faceplate 140. When a key is inserted into the lock 100, the keyway flap 154 may pivot about extensions 156, which are retained by the intermediate faceplate 140, to allow the key to enter the keyway 132.

The cylinder seal 160 is sized and shaped to cover the portion of the well 118 surrounding the plug 130, intermediate faceplate 140, and plug scalp 150. One or more alignment features such as alignment protrusions 164 of the cylinder seal 160 are configured to engage with alignment features such as alignment indentations 120 within the well 118 of the cylinder 110, to retain the cylinder seal 160 in a desired orientation relative to the cylinder 110. A cylinder seal opening 162 is substantially the same size as the exterior face of the plug scalp 150 and allows access to the outer keyway opening 152 therethrough.

The cylinder scalp 170 is sized and shaped to fit around the external section 116 of the cylinder 110 and serves as an exterior housing for the lock 100. A cylinder scalp opening 172 in the face of the cylinder scalp 170 is substantially the same size as the cylinder seal opening 162 and allows access to the outer keyway opening 152 therethrough. The cylinder scalp 170 may be secured to the external section 116 of the cylinder 110 by any suitable securing means, for example, by an adhesive, by one or more mechanical fasteners, by any known welding technique, or the like. In some embodiments, the cylinder scalp 170 may advantageously retain all of the lock components within the lock 100 when secured to the external section 116 of the cylinder 110, such that the lock 100 remains assembled during transport and prior to installation. In such embodiments, the retaining pin 137, which conventionally served this component retaining function, may be omitted. In some embodiments, the space typically occupied by the retaining pin 137 may be used to include an additional tumbler 136 in order to provide an additional degree of security and making the lock 100 more difficult to attack by picking.

The lock 100 further includes weather resistance features that may advantageously prevent failure or inoperability of the lock 100 under adverse weather conditions such as rain, freezing rain, snow, ice, or the like. In the example embodiment illustrated in FIGS. 1A-1C, various components of the lock 100 include drainage features. Specifically, the cylinder 110 includes a cylinder drainage opening 122, the plug scalp 150 includes a plug scalp drainage opening 153, the cylinder seal 160 includes a cylinder seal drainage opening 166, and the cylinder scalp 170 includes a cylinder scalp drainage opening 174. The drainage openings 122, 153, 166, 174 are located along the circumference of their respective lock components such that they are substantially aligned with each other and are disposed at the bottom of the lock 100 when the lock 100 is in an installed configuration. Any foreign matter such as rain, snow, or freezing rain that enters the well 118 and/or the interior of the plug scalp 150, cylinder seal 160, and/or cylinder scalp 170 can pass out of the lock 100 due to gravity through the aligned drainage openings 122, 153, 166, 174. Thus, liquids such as rainwater may drain out to the exterior of the lock 100 rather than entering the plug 130 or the internal section 112 of the cylinder 110 where liquids may cause damage such as by oxidation or corrosion of internal components. In addition, in freezing conditions, cold or supercooled water may drain out to the exterior lock 100 before it can freeze within the lock. In some embodiments, at least some of the drainage openings 122, 153, 166, 174 are disposed lower than the plug 130 when the lock 100 is installed, such that liquid matter entering the external section 116 of the cylinder 110 drains out of the lock 100 rather than entering the internal section 112 and/or the plug 130.

Figure 2:
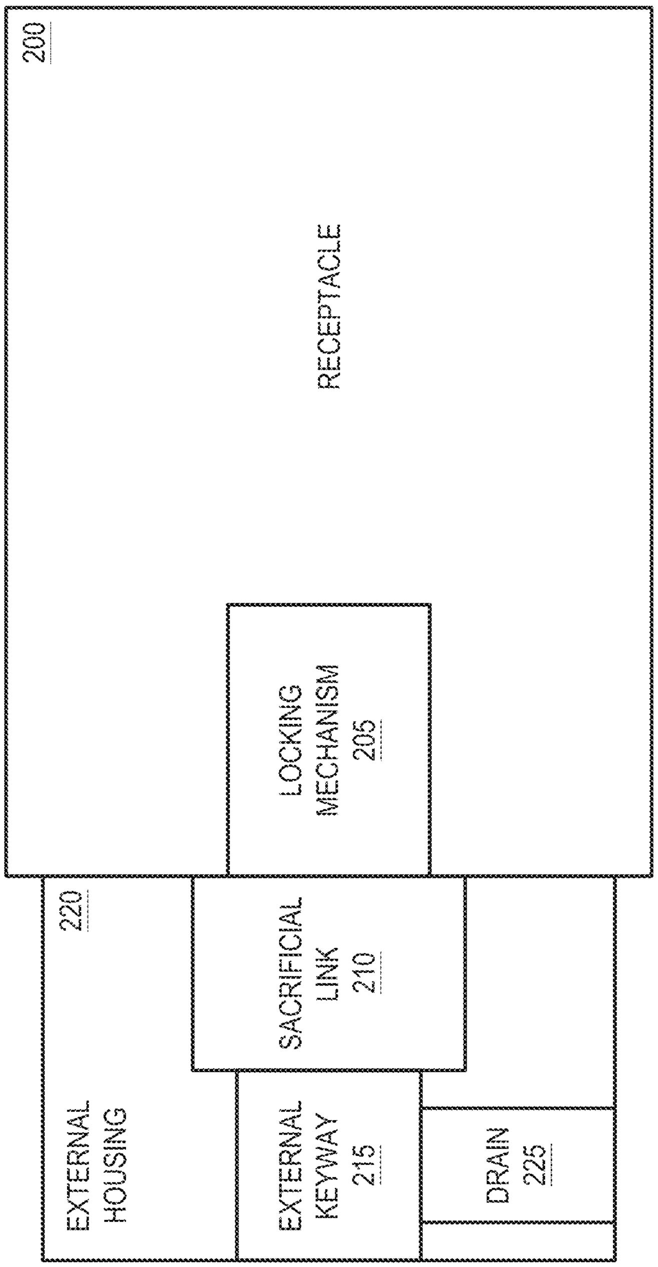
FIG. 2 schematically illustrates components of an example torque-resistant lock.

FIG. 2 schematically illustrates components of a locking receptacle 200 with tamper-resistant and weather-resistant features. The receptacle 200 is securable by a locking mechanism 205 such as a tumbler lock or the like. A sacrificial link 210 is disposed between the locking mechanism 205 and an external keyway 215. An external housing 220 is disposed adjacent to the exterior of the receptacle 200 and prevents access to the locking mechanism 205 other than through the external keyway 215 and the sacrificial link 210. A drain 225 allows foreign matter to pass out of the external keyway 215 and out of the external housing 220 without entering the locking mechanism 205.

The configuration illustrated in FIG. 2 may be implemented in a variety of physical embodiments, of which the lock 100 of FIGS. 1A-1C is a single non-limiting example. For example, the locking mechanism 205 may correspond to the plug 130 and/or cylinder 110 of the lock 100, or other locking mechanism. The sacrificial link 210 may correspond to the tabs 134 and tab openings 144 of the lock 100, or other sacrificial link structures configured to fail during intrusion attempts. The external keyway 215 may correspond to components such as the inner keyway opening 142, outer keyway opening 152, and keyway flap 154 of the lock 100, and/or other components disposed along an outward-facing access path to the sacrificial link 210 and locking mechanism 205. The external housing 220 may correspond to the cylinder scalp 170, the cylinder seal 160, and/or the external section 116 of the cylinder 110 of the lock 100, or one or more similar components in other embodiments. The drain 225 may corresponding to any suitable opening in fluid communication with the external keyway, for example, the drainage openings 122, 153, 166, 174 of the lock 100.

Although the locks of FIGS. 1A-1C and FIG. 2 each include both weather-resistant features and attack-resistant features, it will be understood that various embodiments of the locks described herein may be constructed without weather-resistant features or without attack-resistant features, without departing from the spirit or scope of the present disclosure. Some locks may include a drained external keyway but not a sacrificial link, or may include a sacrificial link and not a drained external keyway, depending on one or more aspects of the intended installation location. For example, a lock to be installed in an enclosed space that is open to the public, but where weather exposure is unlikely, may have a sacrificial link 210 to prevent torque attacks, but may not include a drain 225. In another example, a lock to be installed in a secure or limited-access outdoor location may have a drain 225 to prevent weather damage, but may not include a sacrificial link 210.

Referring now to FIGS. 3A-3D, attack-resistant features of the lock 100 of FIGS. 1A-1C will now be described. Throughout FIGS. 3A-3D, the cylinder seal 160 and the cylinder scalp 170 of the lock 100 are omitted so that the internal components of the lock 100 can be seen. It will be understood that the cylinder seal 160 and the cylinder scalp 170 would be present in an installed configuration.

Figure 3A:
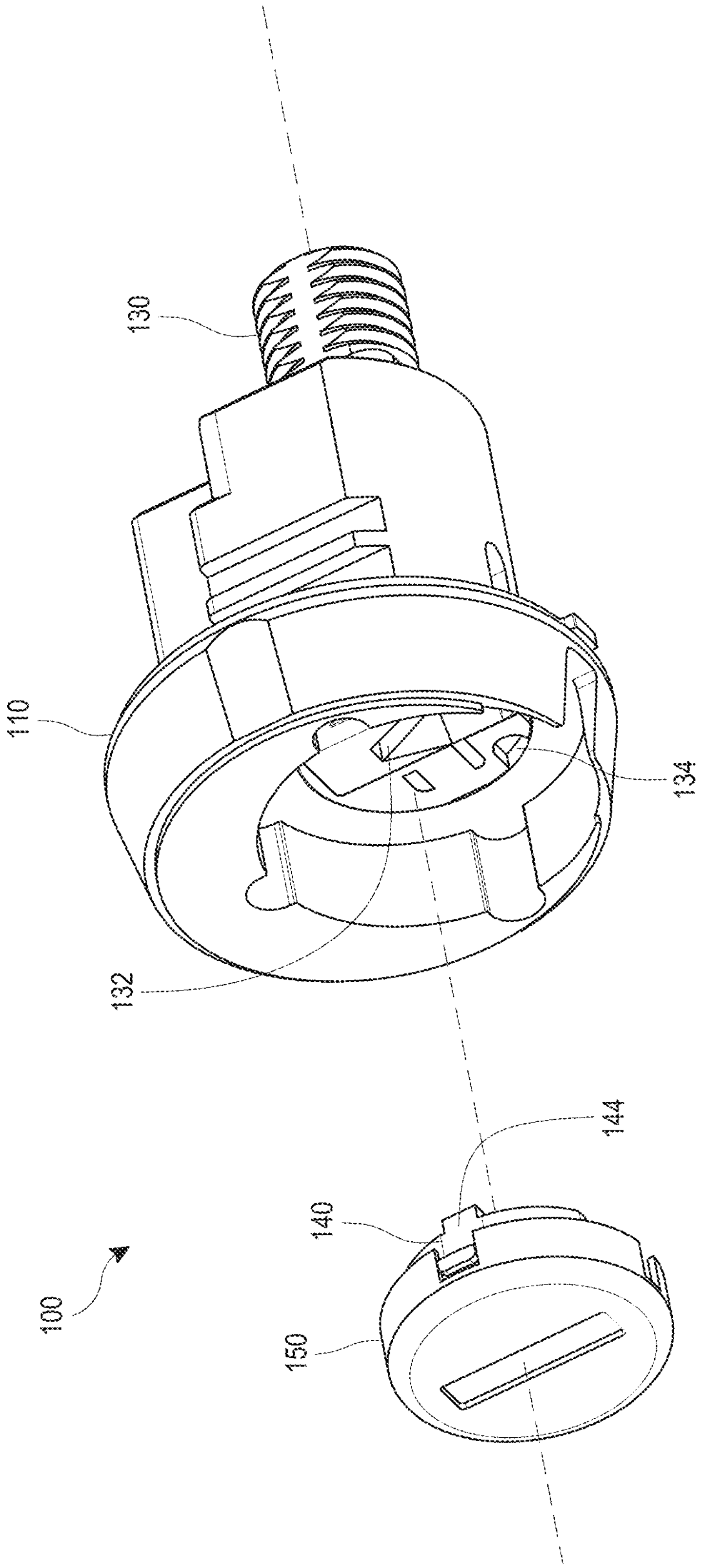
FIGS. 3A-3D depict the operation of attack-resistant features of the lock of FIGS. 1A-1C during a torque attack.

FIG. 3A is an exploded view of the lock 100 prior to a torque attack. The exterior keyway components, including the plug scalp 150 and the intermediate faceplate 140, are contained within the well of the cylinder 110 such that the tabs 144 are disposed within the tab openings 134. The plug 130 is rotationally fixed within the interior of the cylinder 110, and the exterior keyway components are rotationally fixed, relative to the plug 130, by the tabs 144 within the tab openings 134. In the initial configuration of FIG. 3A, the keyway openings of the intermediate faceplate 140 and the plug scalp 150 are aligned with the keyway 132 of the plug 130.

Figure 3B:
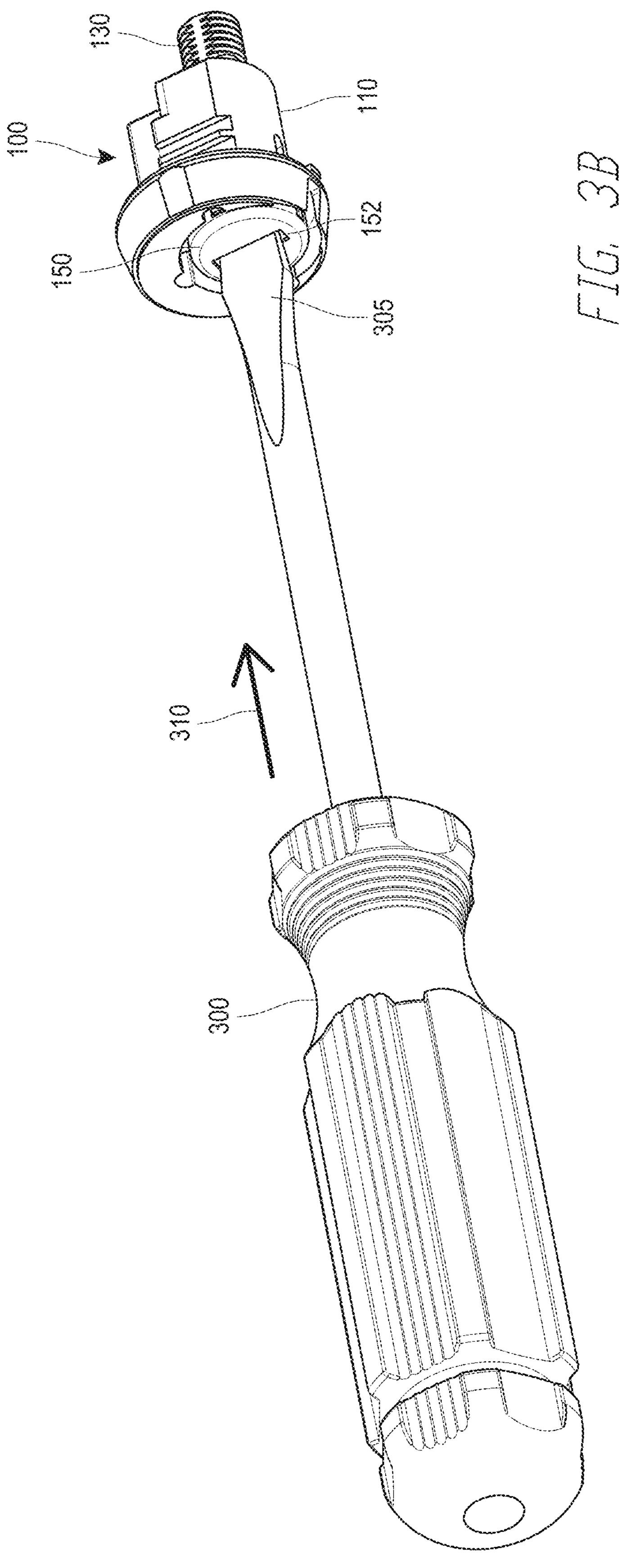
Figure 3C:
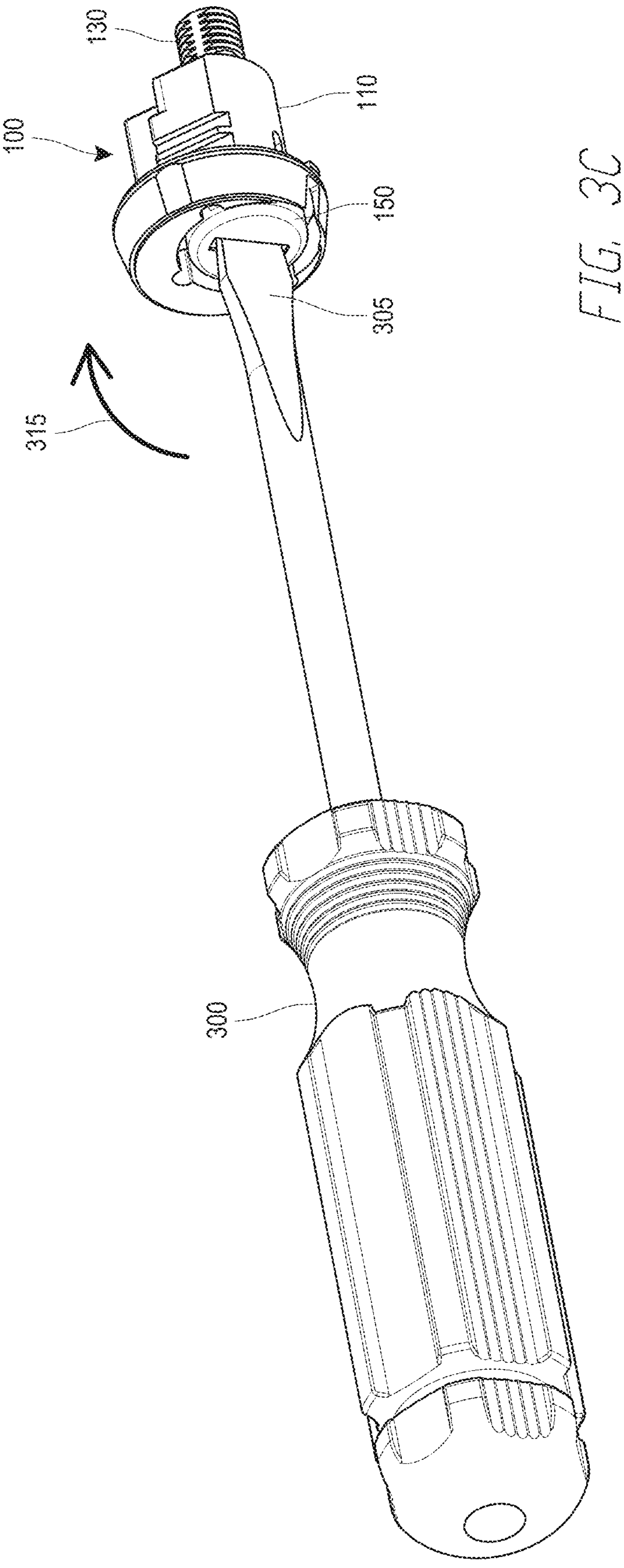
Figure 3D:
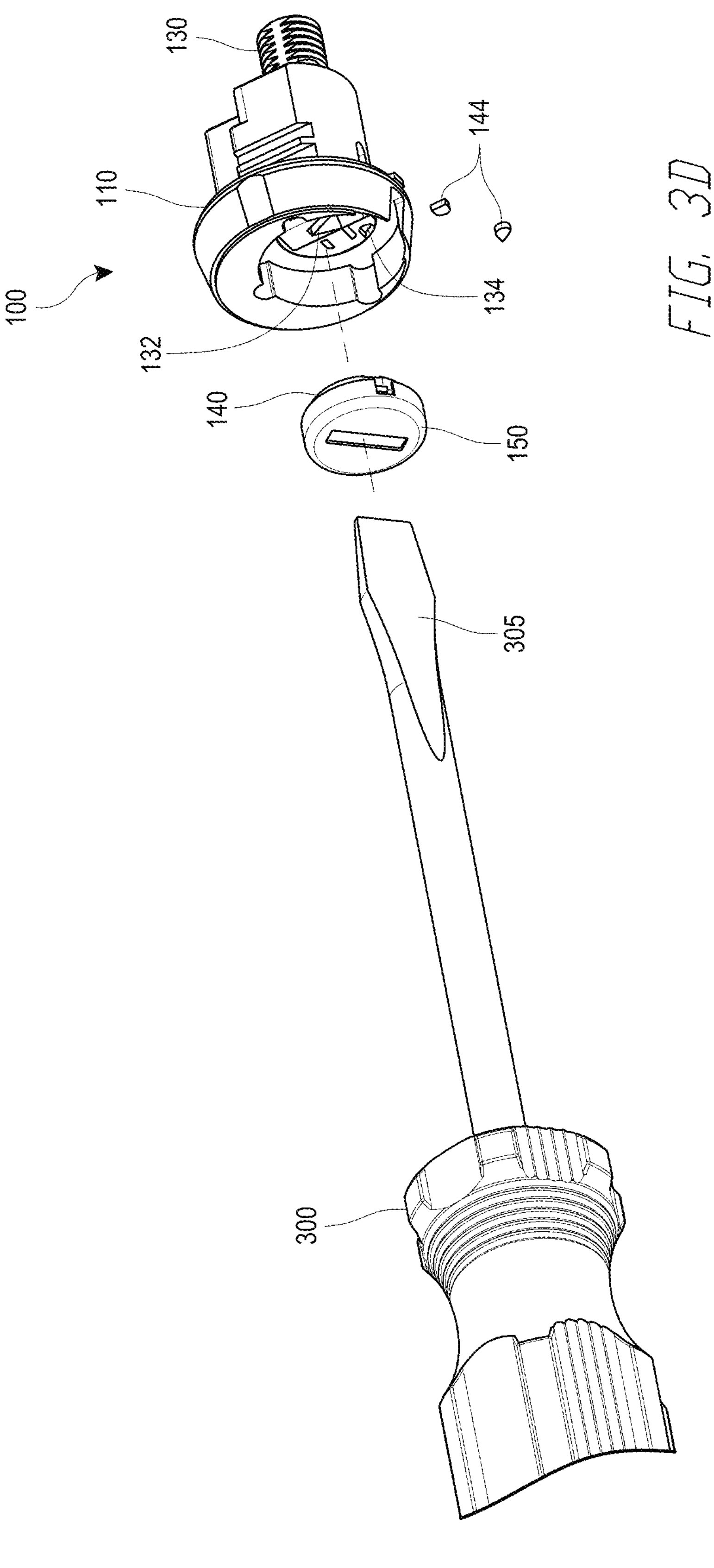

FIG. 3B illustrates an initial stage of a torque attack on the lock 100. In a typical method of attacking cylinder locks such as the lock 100, a blade 305 of a tool 300 is inserted along a longitudinal direction 310 into the external keyway opening, such as the outer keyway opening 152. Although the tool 300 is illustrated in FIGS. 3B-3D as a flat-head screwdriver, various other flat-bladed tools may frequently be used to attack cylinder locks. In the example lock 100, the blade 305 may be inserted until the tip of the blade 305 abuts the plug 130 and/or partially enters the keyway 132. Because flat-bladed tools used for torque attacks are generally larger than the keys corresponding to the lock 100, the blade 305 typically will not extend substantially into the keyway 132 within the plug 130.

FIG. 3C illustrates a second stage of a torque attack on the lock 100. In a typical method of attacking cylinder locks such as the lock 100, the tool 300 is rotated forcefully about the longitudinal axis, along a rotational direction 315. In conventional cylinder locks, the forceful rotation of the blade 305 within the external keyway causes the entire lock, or a substantial portion thereof, to rotate with the blade 305, either breaking the lock or dislodging it entirely such that the lock can be opened or removed and the attacker can access the interior of the locked receptacle. However, in the attack-resistant lock 100, the sacrificial link components within the lock 100 mitigate the damage to the lock 100 caused by the torque attack.

FIG. 3D is an exploded view of the aftermath of a torque attack on the attack-resistant lock 100. When the tool 300 is rotated in an attempt to break or dislodge the lock, as shown in FIG. 3C, a torque is applied to the cylinder scalp 150 and/or intermediate faceplate 140. The only structures rotationally fixing the intermediate faceplate 140 and the cylinder scalp 150 to the plug 130 are the tabs 144, which may be integrally formed with the intermediate faceplate 140 from a plastic or other polymeric material. The force required to cause the intermediate faceplate 140 material to break or snap can be substantially less than the force that would be required to dislodge the plug 130 from the cylinder 110 and/or to dislodge the cylinder 110 from its mounting within the wall of the receptacle. Accordingly, the tabs 144 are retained within the tab openings 134 and break free of the intermediate faceplate 140 before the tool 300 can apply sufficient torque to dislodge the plug 130 or cylinder 110. The separated tabs 144 may be retained within the tab openings 134, may be retained within the cylinder 110, and/or may fall out of the lock 100 through a drain opening in the cylinder 110.

In the configuration of FIG. 3D following the torque attack of FIGS. 3B and 3C, the receptacle or other volume secured by the lock 100 remains secured. The intermediate faceplate 140 and the plug scalp 150 are no longer rotationally fixed to the plug 130, and in some cases may be freely rotatable about the longitudinal axis. Advantageously, all or substantially all components of the lock may still be retained by the cylinder scalp 170 (not shown in FIGS. 3A-3D). Due to the relatively small size of the internal keyway 132 of the plug 130, the plug 130 is still protected from subsequent attacks with a similarly sized blade 305. The attacker may be discouraged from further attempts at attacking the lock because the initial attack causes breakage of certain lock components but does not cause the lock to open. Moreover, the lock 100 remains operable despite the attack, as the newly rotatable intermediate faceplate 140 and plug scalp 150 may be rotated back into alignment with the keyway 132 to allow a key to be inserted into the plug 130 and open the lock 100.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open"

terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A lock comprising:

a locking mechanism comprising a keyway and one or more tab openings, the locking mechanism configured to receive a key blade for actuating the locking mechanism; and an external structure comprising:

a housing at least partially surrounding the locking mechanism, the housing comprising an internal section disposed about the locking mechanism and an external section aligned with the keyway, the external section comprising a first drain opening and a well aligned with the keyway of the locking mechanism;

an external keyway structure retained within the well and comprising one or more tabs configured to interlock with the one or more tab openings to rotationally couple the external keyway structure to the locking mechanism;

a scalp at least partially covering the external section and comprising a second drain opening aligned with the first drain opening; and a cylinder seal disposed at least partially between the scalp and the locking mechanism, the cylinder seal comprising a third drain opening aligned with the first and second drain openings.

2. The lock of claim 1, wherein the external section of the housing is integrally formed with the internal section.

3. The lock of claim 1, wherein the cylinder seal is at least partially disposed within the well.

4. The lock of claim 1, wherein the external keyway structure comprises an external keyway drain opening aligned with the first drain opening.

5. The lock of claim 1, wherein the one or more tabs comprise a sacrificial link configured to break when a torque is applied to the external keyway structure.

6. The lock of claim 5, wherein breaking the sacrificial link allows the external keyway structure to rotate within the well.

7. The lock of claim 1, wherein the first drain opening comprises a slot extending through a sidewall of the well.

8. The lock of claim 1, further comprising a keyway flap pivotable between an open position and a closed position blocking ingress of foreign matter into the keyway, wherein the keyway flap is biased in the closed position.

9. The lock of claim 1, wherein the locking mechanism comprises a pin tumbler lock.

10. A method of manufacturing a lock, the method comprising:

providing a locking mechanism comprising a keyway and one or more tab openings, the locking mechanism configured to receive a key blade for actuating the locking mechanism;

inserting the locking mechanism at least partially into an internal section of a housing, the housing further comprising an external section aligned with the keyway and having a first drain opening therein, the external section comprising a well aligned with the keyway of the locking mechanism;

inserting, into the well, an external keyway structure comprising one or more tabs configured to interlock with the one or more tab openings to rotationally couple the external keyway structure to the locking mechanism;

coupling a cylinder seal to the external section of the housing such that a second drain opening in the cylinder seal is aligned with the first drain opening; and at least partially covering the external section of the housing with a scalp comprising a third drain opening such that the cylinder seal is disposed at least partially between the scalp and the locking mechanism, and such that the third drain opening is aligned with the first and second drain openings.

11. The method of claim 10, wherein coupling the cylinder seal to the external section of the housing comprises at least partially inserting the cylinder seal into the well.

12. The method of claim 10, wherein the cylinder seal is coupled to the external section of the housing after the external keyway structure is inserted such that the cylinder seal retains the external keyway structure within the well.

13. The method of claim 10, wherein inserting the external key structure into the well comprises aligning the external keyway structure such that the one or more tabs fit within the corresponding tab openings.

14. The method of claim 10, wherein the external keyway structure comprises an external keyway drain opening, and wherein the external keyway drain opening is aligned with the first drain opening.

15. The method of claim 10, further comprising securing the scalp to the external section of the housing with an adhesive or by welding.

16. The method of claim 10, further comprising installing the lock within a wall or a door of a receptacle such that the internal section of the housing is disposed within an inner volume of the receptacle and the external section of the housing is disposed outside the inner volume of the receptacle.

* * * * *